United States Patent [19]

Mentzell

[11] Patent Number: 4,643,031
[45] Date of Patent: Feb. 17, 1987

[54] LOAD TESTING

[76] Inventor: Walter J. Mentzell, 486 Willowbrook Rd., Apollo, Pa. 15613

[21] Appl. No.: 644,447

[22] Filed: Aug. 27, 1984

[51] Int. Cl.[4] .............................................. G01L 5/00
[52] U.S. Cl. ............................................... 73/862.56
[58] Field of Search .................. 73/862.56, 862, 158, 73/1 B, 432 V

[56] References Cited

U.S. PATENT DOCUMENTS

| | | | |
|---|---|---|---|
| 3,722,267 | 3/1973 | Gordon | 73/862.56 |
| 4,039,084 | 8/1977 | Shinitsu et al. | 73/862.56 |
| 4,509,377 | 4/1985 | Mentzell et al. | 73/862.56 |

FOREIGN PATENT DOCUMENTS 0142739  3/1961  U.S.S.R. ........................... 73/862.56

Primary Examiner—Donald O. Woodiel

[57] ABSTRACT

A method of testing the load lifting ability of a lifting device, including connecting the lifting device to a securement able to resist more force than a weight for which the lifting device is to be tested, and operating the lifting device until the force exerted by the lifting device on the securement equals said weight, wherein the improvement comprises that the securement is the lifting device itself. In a lifting device including a movable frame and lifting means on the frame for lifting loads, the improvement comprising means for enabling the lifting means to pull against the frame.

18 Claims, 2 Drawing Figures

LOAD TESTING

FIELD OF THE INVENTION

The present invention relates to the load testing of lifting devices.

BACKGROUND OF THE INVENTION

U.S. Pat. No. 4,509,377 dated Apr. 9, 1985, for "Load Testing" shows load testing of a crane where pull is against buliding beams of the building containing the crane. Said U.S. Pat. No. 4,509,377 is incorporated here by reference, for an introduction to load testing, particularly load testing of cranes.

Russian Author's Certificate No. 670,847 shows a test where pull is against a ferromagnetic sheet secured in the ground at a test site. An electromagnet is used for making the connection to the sheet.

SUMMARY

It is an object of the invention to provide an improved securement in the load testing of lifting devices.

This as well as other objects which will become apparent in the discussion that follows, are achieved according to the present invention by (1) a method of testing the load lifting ability of a lifting device, including connecting the lifting device to a securement able to resist more force than a weight for which the lifting device is to be tested, and operating the lifting device until the force exerted by the lifting device on the securement equals said weight, wherein the improvement comprises that the securement is the lifting device itself; and (2) in a lifting device including a movable frame and lifting means on the frame for lifting loads, the improvement comprising means for enabling the lifting means to pull against the frame.

DESCRIPTION OF THE PREFERRED EMBODIMENTS

Figure 1:
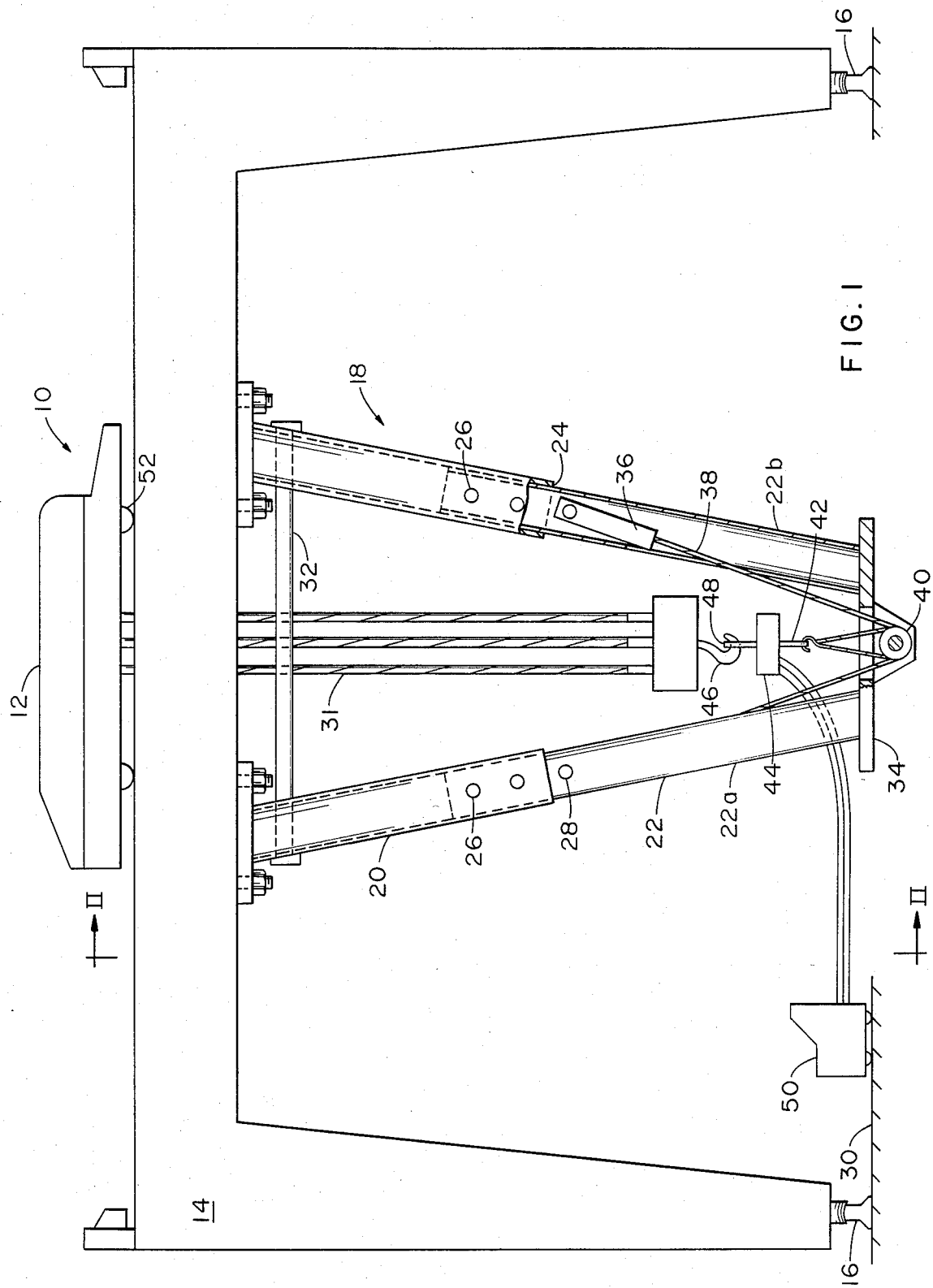
FIG. 1 is an elevational view of a gantry crane illustrating one embodiment of the invention.

Referring first to FIG. 1, the gantry crane 10 includes a trolley 12 which runs on rails 56 of box frames 14. The box frames are themselves equipped to move on rails 16.

According to one embodiment of the invention, there is bolted to box frames 14 a telescoping structure 18, including outer legs 20 and inner legs 22. The legs telescope at point 24 and are pinned rigidly together by pins 26 running through a hole in outer legs 20 and an appropriate one of a set of holes 28 in inner legs 22. This telescoping feature permits fitting the structure to various sizes of crane box frames having different distances to floor level 30 and various lengths of pick of cable 31.

Tie rods 32 above and beams 34 below complete the basic structure.

Leg 22b has been broken partially away to expose a hydraulic cylinder 36 mounted within it. The cylinder 36 provides for about 5 feet of travel by cable 38. Cable 38 passes around pulley 40 and is hooked in eye 42 on the lower side of the load cells unit 44. A matching cylinder and cable is used in leg 22a, in order to balance loading of the structure. The hook 46 of the crane is placed in eye 48 on the upper side of unit 44.

To perform a load test, the hydraulic fluid pressure in cylinders 36 is elevated until a constant pull of desired size is exerted through cables 38 on eye 42. In order to check the ability of the crane to stop a load in the up and/or down positions, the winch (not shown) in trolley 12 is operated to move hook 46 approximately while the fluid content in the hydraulic cylinders is correspondingly increased or decreased at constant pressure and thus constant load. In this way, an ability to give under load is provided in the structure. Attainment of desired loading is monitored by an operator at console 50 providing appropriate electronic processing of the strain gage signals of unit 44 and digital readout.

Ability of the trolley to move under load may be performed by appropriate driving of wheels 52. In doing this, the line of force moves out of the vertical direction, as disclosed and claimed in the above-referenced U.S. Pat. No. 4,509,377. This may be done under constant load by appropriate feeding of hydraulic fluid at constant pressure.

Figure 2:
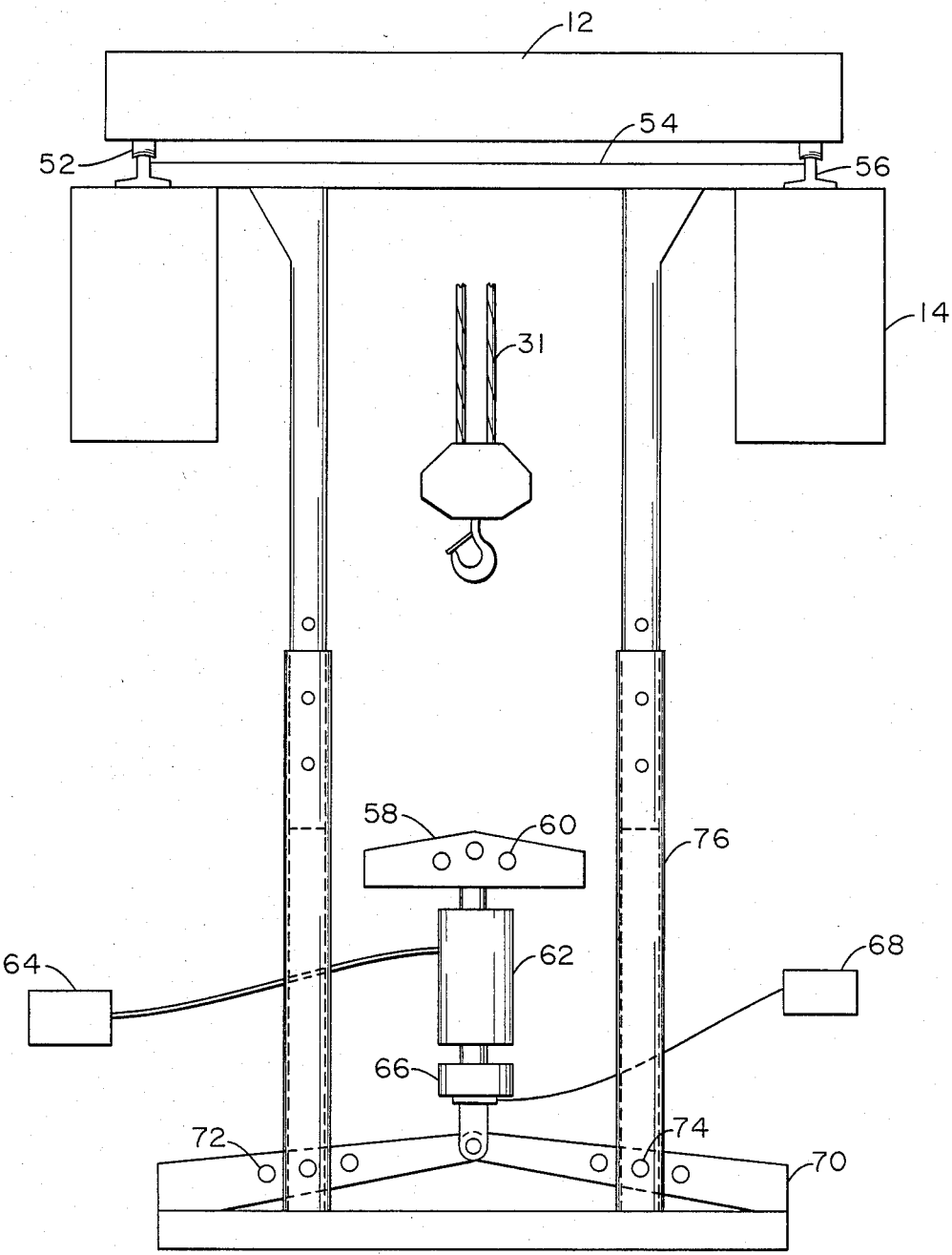
FIG. 2 is a view generally taken on the cutting plane II—II of FIG. 1 and illustrating a second embodiment of the invention.

Referring now to FIG. 2, a second embodiment of the invention is shown attached to box frames 14. Here, the structure includes beams 54 connected to rails 56. Beams 54 may likewise be of a telescoping type, in order to accomodate various separations between trolley rails 56. This embodiment has the advantage that all forces during testing are transmitted to the rails 56. One set of forces reaches the rails through beams 54, while the opposing set reaches the rail through trolley wheels 52.

Rather than connect beams 54 directly to rails 56, beams 54 can connect to reinforcing bars (not shown) running parallel to rails 56 and being clamped thereto.

Other distinctive features of FIG. 2 are the provision of a lifting beam 58 with multiple pins 60, three in this instance, to accommodate optionally sister hooks or single hooks. Additionally, this embodiment uses a single, double-actuated hydraulic cylinder 62, adjustable between 0 and 400 tons. It is driven by hydraulic fluid compressor 64, with an adjustable pressure gauge. It, like the hydraulic cylinders in FIG. 1, builds give into the structure. Flat load cell 66, strain type, works in conjunction with analog meter display 68 for indicating loads between 0 and 400 tons. Centrally hinged beam 70, in combination with holes 72 for selective pinning by pins 74, provides for adjustment, in addition to that of telescoping legs 76, to accommodate various sizes of cranes.

As compared with the embodiment of FIG. 1, that of FIG. 2 is additionally advantageous in that legs 76 are vertical and have no lateral forces midway along their lengths, such as are created by cylinders 36 in FIG. 1.

What is claimed is:

1. A method of testing the load lifting ability of a lifting device, including connecting the lifting device to a securement able to resist a force greater than a weight for which the lifting device is to be tested, and operating the lifting device until the force exerted by the lifting device on the securement equals said weight, wherein the improvement comprises connecting the lifting device to itself as the securement.

2. A method as claimed in claim 1, further comprising attaching a structure to the lifting device for transmitting testing force to the lifting device.

3. A method as claimed in claim 2, the structure transmitting testing force to a frame of the lifting device.

4. A method as claimed in claim 2, the structure transmitting testing force to rails of the lifting device.

5. In a lifting device including a movable frame and lifting means on the frame for lifting loads, the improvement comprising means for enabling the lifting means to pull against the frame,
wherein the means for enabling comprises a structure attached to the frame, and
wherein the structure comprises telescoping means for accommodating various sizes of lifting means.

6. In a lifting device including a movable frame and lifting means on the frame for lifting loads, the lifting means including connecting means for connecting the lifting means to a load, the improvement comprising means for enabling the connecting means of the lifting means to be connected to the frame, so that the lifting means can pull against the frame instead of pulling on a load to be lifted, further comprising, in the means for enabling, means for permitting travel of the lifting means.

7. A device as claimed in claim 6, wherein the means for permitting travel comprises hydraulic means.

8. In a lifting device including a movable frame and lifting means on the frame for lifting loads, the improvement comprising means for enabling the lifting means to pull against the frame,
further comprising means for permitting travel of the lifting means,
wherein the means for permitting travel comprises hydraulic means, and
wherein the lifting means comprises a trolley movable relative to the frame.

9. In a lifting device including a movable frame and lifting means on the frame for lifting loads, the lifting means including connecting means for connecting the lifting means to a load, the improvement comprising means for enabling the connecting means of the lifting means to be connected to the frame, so that the lifting means can pull against the frame instead of pulling on a load to be lifted, the frame including rails (56), all forces during pull against the frame being transmitted through the means for enabling to said rails.

10. A method of testing a lifting device including a movable frame and lifting means on the frame for lifting loads, the lifting means including connecting means for connecting the lifting means to a load, comprising connecting the connecting means, instead of to a load, to the frame and pulling with the lifting means against the frame.

11. A method as claimed in claim 10, wherein the step of connecting is carried out by interposing a structure attached to the frame between the connecting means and the frame such that the pull is transmitted to the frame through the structure attached to the frame.

12. A method as claimed in claim 11, the connecting means comprising a hook, further comprising permitting the structure to give, and moving said hook under load controlled by the give.

13. A method as claimed in claim 12, further comprising supplying the give by hydraulic means.

14. A method as claimed in claim 13, wherein the hydraulic means comprises a hydraulic cylinder.

15. A method of testing a lifting device including a movable frame and lifting means on the frame for lifting loads, comprising pulling with the lifting means against the frame,
further comprising transmitting the pull to the frame through a structure attached to the frame, and
further comprising permitting the structure to give, and moving a trolley of the lifting means under load controlled by the give.

16. A method as claimed in claim 15, further comprising supplying the give by hydraulic means.

17. A method as claimed in claim 16, wherein the hydraulic means comprises a hydraulic cylinder.

18. A method of testing the load lifting ability of a lifting device, including connecting the lifting device to a securement able to resist a force greater than a weight for which the lifting device is to be tested, and operating the lifting device until the force exerted by the lifting device on the securement equals said weight, wherein the improvement comprises interposing a hydraulic cylinder between the lifting device and the securement and varying fluid content in the hydraulic cylinder, whereby the lifting device is tested as if said weight were moving.

* * * * *